US011000800B2

(12) United States Patent
Sato et al.

(10) Patent No.: US 11,000,800 B2
(45) Date of Patent: May 11, 2021

(54) GAS SEPARATION MEMBRANE, GAS SEPARATION MEMBRANE ELEMENT, AND GAS SEPARATION METHOD

(71) Applicant: TORAY INDUSTRIES, INC., Tokyo (JP)

(72) Inventors: Kazuki Sato, Shiga (JP); Masakazu Koiwa, Shiga (JP); Takao Sasaki, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 34 days.

(21) Appl. No.: 16/345,498

(22) PCT Filed: Oct. 27, 2017

(86) PCT No.: PCT/JP2017/038962
§ 371 (c)(1),
(2) Date: Apr. 26, 2019

(87) PCT Pub. No.: WO2018/079729
PCT Pub. Date: May 3, 2018

(65) Prior Publication Data
US 2019/0275461 A1    Sep. 12, 2019

(30) Foreign Application Priority Data

Oct. 28, 2016    (JP) .............................. JP2016-211464

(51) Int. Cl.
*B01D 53/22*     (2006.01)
*B01D 63/10*     (2006.01)
(Continued)

(52) U.S. Cl.
CPC ............. *B01D 53/22* (2013.01); *B01D 63/10* (2013.01); *B01D 69/10* (2013.01); *B01D 69/12* (2013.01); *B01D 71/56* (2013.01)

(58) Field of Classification Search
CPC ........ B01D 53/22; B01D 63/10; B01D 69/10; B01D 69/12; B01D 2256/16;
(Continued)

(56) References Cited

U.S. PATENT DOCUMENTS

| 5,049,167 A | * | 9/1991 | Castro ................. B01D 69/125 95/55 |
| 2014/0083925 A1 | * | 3/2014 | Stafford ............... B01D 69/122 210/489 |

(Continued)

FOREIGN PATENT DOCUMENTS

| CN | 103702747 A | 4/2014 |
| EP | 0179474 A2 | 4/1986 |

(Continued)

OTHER PUBLICATIONS

Albo et al. "Gas transport properties of interfacially polymerized polyamide composite membranes under different pre-treatments and temperatures", journal of Membrane Science, 449, (2014), pp. 109-118.

(Continued)

*Primary Examiner* — Krishnan S Menon
(74) *Attorney, Agent, or Firm* — Birch, Stewart, Kolasch & Birch, LLP

(57) ABSTRACT

The present invention relates to a gas separation membrane including: a supporting membrane; and a separation functional layer which is provided on the supporting membrane and includes a crosslinked polyamide obtained by polycondensation of a polyfunctional amine and a polyfunctional acid halide, in which, in the crosslinked polyamide, the number A of terminal amino groups, the number B of terminal carboxy groups, and the number C of amide groups satisfy $(A+B)/C \leq 0.66$.

8 Claims, 1 Drawing Sheet

(51) Int. Cl.
    *B01D 69/10*     (2006.01)
    *B01D 69/12*     (2006.01)
    *B01D 71/56*     (2006.01)

(58) Field of Classification Search
    CPC .......... B01D 2256/18; B01D 2257/504; B01D 53/228; B01D 71/56; Y02C 20/40
    See application file for complete search history.

(56) References Cited

U.S. PATENT DOCUMENTS

| | | |
|---|---|---|
| 2014/0137740 A1 | 5/2014 | Aburaya et al. |
| 2015/0165390 A1 | 6/2015 | Hiranabe et al. |
| 2017/0056838 A1* | 3/2017 | Lee .................. B01D 69/105 |
| 2017/0120201 A1 | 5/2017 | Shimura et al. |
| 2017/0136422 A1 | 5/2017 | Ogawa et al. |
| 2017/0368510 A1 | 12/2017 | Tanaka et al. |

FOREIGN PATENT DOCUMENTS

| | | |
|---|---|---|
| EP | 0219878 A2 | 4/1987 |
| WO | WO 2013/180218 A1 | 12/2013 |
| WO | WO 2016/002819 A1 | 1/2016 |
| WO | WO 2016/002821 A1 | 1/2016 |
| WO | WO 2016/104781 A1 | 6/2016 |
| WO | WO 2016/136966 A1 | 9/2016 |

OTHER PUBLICATIONS

International Search Report, issued in PCT/JP2017/038962, PCT/ISA/210, dated Dec. 12, 2017.

Written Opinion of the International Searching Authority, issued in PCT/JP2017/038962, PCT/ISA/237, dated Dec. 12, 2017.

Extended European Search Report for European Application No. 17864530.5, dated May 7, 2020.

Chinese Office Action and Search Report for Chinese Application No. 201780066022.X, dated Jan. 29, 2021, with an English translation.

* cited by examiner

GAS SEPARATION MEMBRANE, GAS SEPARATION MEMBRANE ELEMENT, AND GAS SEPARATION METHOD

TECHNICAL FIELD

The present invention relates to a gas separation membrane and a gas separation membrane element each for separating a light gas typified by helium and hydrogen from carbon dioxide by using a polyamide composite membrane, and a gas separation method using the same.

BACKGROUND ART

In recent years, hydrogen is attracting attention as a clean energy source. Hydrogen is obtained by gasifying a fossil fuel such as natural gas and coal, and removing carbon dioxide from a mixed gas containing hydrogen and carbon dioxide as main components. The gas as a treatment target has passed through steam reforming and aqueous gas shift and is characterized by high temperature and high pressure.

As a method for concentrating a specific gas from a mixed gas at a low cost, focus is placed on a membrane separation method of selectively passing a target gas by utilizing a difference in gas permeability of a material.

Non-Patent Document 1 discloses a technique where a crosslinked aromatic polyamide is formed by an interfacial polycondensation reaction and since a very thin functional layer is thereby formed, high gas permeability is obtained.

BACKGROUND ART DOCUMENT

Non-Patent Document

Non-Patent Document 1: Albo, other 3 persons, 'Journal of Membrane Science', 449, 2014, pp. 109-118

SUMMARY OF THE INVENTION

Problems that the Invention is to Solve

However, the above-described technique has a problem that separation selectivity between a light gas such as hydrogen or helium and carbon dioxide is low and in turn, the carbon dioxide separation efficiency is low.

The present invention has been made in consideration of such a conventional situation, and an object of the present invention is to provide a gas separation membrane and a gas separation membrane element each satisfying both permeability to a light gas such as hydrogen or helium and separation selectivity, and a gas separation method using the same.

Means for Solving the Problems

The gas separation membrane, the gas separation membrane element, and the gas separation method of the present invention for attaining the object above take the following configurations.

[1] A gas separation membrane including:
 a supporting membrane; and
 a separation functional layer which is provided on the supporting membrane and includes a crosslinked polyamide obtained by polycondensation of a polyfunctional amine and a polyfunctional acid halide,
in which, in the crosslinked polyamide, the number A of terminal amino groups, the number B of terminal carboxy groups, and the number C of amide groups satisfy $(A+B)/C \leq 0.66$.

[2] The gas separation membrane according to [1], in which, in the crosslinked polyamide, the number A of terminal amino groups, the number B of terminal carboxy groups, and the number C of amide groups satisfy $0.48 \leq (A+B)/C$.

[3] The gas separation membrane according to [1] or [2], in which, in the crosslinked polyamide, the number B of terminal carboxy groups and the number C of amide groups satisfy $B/C \leq 0.35$.

[4] The gas separation membrane according to any one of [1] to [3], in which, in the crosslinked polyamide, the number B of terminal carboxy groups and the number C of amide groups satisfy $0.22 \leq B/C$.

[5] The gas separation membrane according to any one of [1] to [4], in which the crosslinked polyamide is a crosslinked aromatic polyamide.

[6] The gas separation membrane according to any one of [1] to [5], in which the crosslinked polyamide has a nitro group.

[7] A gas separation membrane element including:
 a central tube for collecting permeate gas; and
 the gas separation membrane according to any one of [1] to [6] spirally wound around the central tube.

[8] A gas separation method using the gas separation membrane according to any one of [1] to [6], the method including the following steps:
 (1) a step of feeding a mixed gas containing carbon dioxide to one face of the gas separation membrane; and
 (2) a step of, after the step (1), obtaining a gas having a carbon dioxide concentration lower than a carbon dioxide concentration of the mixed gas, from the other face of the gas separation membrane.

[9] The gas separation method according to [8], in which the mixed gas contains at least either hydrogen or helium.

Advantage of the Invention

According to the present invention, a gas separation membrane and a gas separation membrane element each satisfying both permeability to a light gas such as hydrogen or helium and separation selectivity, and a gas separation method using the same can be provided.

MODE FOR CARRYING OUT THE INVENTION

1. Gas Separation Membrane

Figure 1:
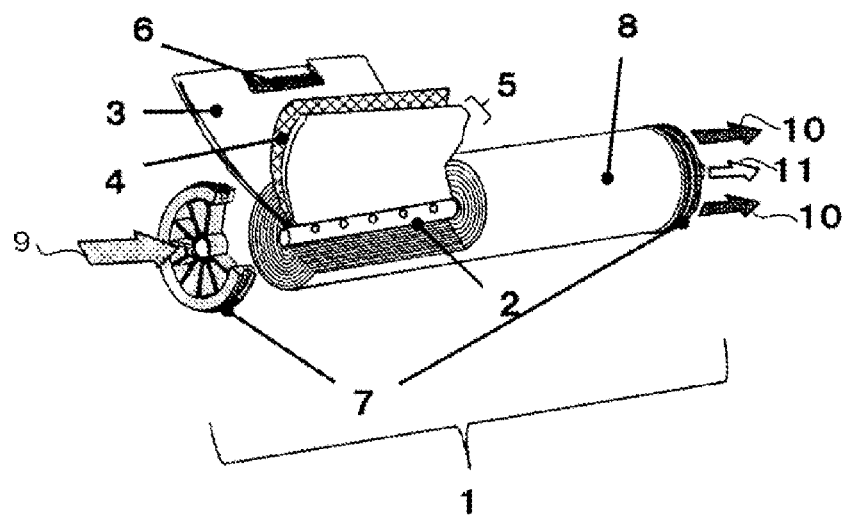
FIG. 1 is a partially exploded perspective view illustrating an embodiment of the gas separation membrane element of the present invention.

The gas separation membrane includes a supporting membrane and a separation functional layer which is provided on the supporting membrane and includes a crosslinked polyamide obtained by polycondensation of a polyfunctional amine and a polyfunctional acid halide.

The supporting membrane may have a substrate and a porous supporting layer. However, the present invention is not limited to this configuration. For example, the supporting membrane may be composed of a porous supporting layer without including a substrate.

(1-1) Substrate

As the substrate, a polyester-based polymer, a polyamide-based polymer, a polyolefin-based polymer, and a mixture or copolymer thereof, etc. may be mentioned. Among others, a polyester-based polymer fabric having high mechanical and thermal stability is particularly preferred. As the form of the fabric, a long-fiber nonwoven fabric, a short-fiber nonwoven fabric, and furthermore, a woven or knitted fabric can be favorably used. Here, the long-fiber nonwoven fabric indicates a nonwoven fabric having an average fiber length of 300 mm or more and an average fiber diameter of 3 μm to 30 μm.

The substrate preferably has an air permeability of 0.5 cc/cm$^2$/sec or more and 5.0 cc/cm$^2$/sec or less. When the air permeability of the substrate is within the above range, a polymer solution working out to the porous supporting layer impregnates the substrate, so that the adhesion to the substrate can be enhanced and the physical stability of the supporting membrane can be increased.

The thickness of the substrate is preferably from 10 μm to 200 μm, more preferably from 30 μm to 120 μm. In the present description, unless otherwise indicated, the thickness means an average value. Here, the average value represents an arithmetic average value. More specifically, the thickness of each of the substrate and the porous supporting layer can be determined through cross-sectional observation by calculating an average value of thicknesses of 20 points measured at 20 μm intervals in a direction (plane direction of the membrane) perpendicular to the thickness direction.

(1-2) Porous Supporting Layer

The porous supporting layer has substantially no gas separation performance and is provided to substantially impart strength to the separation functional layer having gas separation performance. The pore size and pore distribution of the porous supporting layer are not particularly limited, but the pore size may be uniform over the whole porous supporting layer or may be gradually increased from a porous supporting layer surface on the side contacted with the separation functional layer to another surface. In addition, the pore size in a surface on the side contacted with the separation functional layer is preferably 0.1 nm or more and 100 nm or less.

The composition of the porous supporting layer is not particularly limited, but the porous supporting layer contains, for example, at least one polymer selected from the group consisting of homopolymers and copolymers such as polysulfone, polyethersulfone, polyamide, polyester, cellulosic polymer, vinyl polymer, polyphenylene sulfide, polyphenylene sulfide sulfone, polyphenylene sulfone and polyphenylene oxide.

Examples of the cellulosic polymer include cellulose acetate and cellulose nitrate, and examples of the vinyl polymer include polyethylene, polypropylene, polyvinyl chloride and polyacrylonitrile.

The porous supporting layer preferably contains a homopolymer or copolymer such as polysulfone, polyamide, polyester, cellulose acetate, cellulose nitrate, polyvinyl chloride, polyacrylonitrile, polyphenylene sulfide and polyphenylene sulfide sulfone. The porous supporting layer more preferably contains cellulose acetate, polysulfone, polyphenylene sulfide sulfone or polyphenylene sulfone. Among these materials, a polysulfone is particularly preferred because of its high chemical, mechanical and thermal stability and ease of molding.

Specifically, the porous supporting layer preferably contains a polysulfone including a repeating unit represented by the chemical formula shown below. In the porous supporting layer containing this polysulfone, its pore size is easy to control, and the dimensional stability of the porous supporting layer is high. Incidentally, n in the following formula means the number of repetitions.

[Chem. 1]

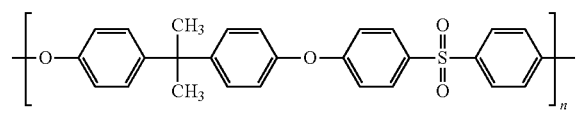

In the polysulfone, the weight average molecular weight (Mw) when measured by gel permeation chromatography (GPC) using N-methylpyrrolidone as a solvent and using polystyrene as a standard substance is preferably 10,000 or more and 200,000 or less, more preferably 15,000 or more and 100,000 or less. When Mw of the polysulfone is 10,000 or more, favorable mechanical strength and heat resistance for a porous supporting layer can be obtained. In addition, when Mw of the polysulfone is 200,000 or less, the solution viscosity is in an appropriate range, and good moldability can be realized.

The porous supporting layer preferably contains the above-described polymer as a main component. Specifically, in the porous supporting layer, the ratio of the above-described polymer (in the case of containing a plurality of polymers, the total of ratios of respective polymers) is preferably 70 wt % or more, 80 wt % or more, or 90 wt % or more, and furthermore, the porous supporting layer may be composed of the above-described polymer.

The thickness of each of the substrate and the porous supporting layer affects the strength of the gas separation membrane and the packing density in an element fabricated using the membrane. In order to obtain sufficient mechanical strength and packing density, the total of thicknesses of the substrate and porous supporting layer is preferably 30 μm or more and 300 μm or less, more preferably 100 μm or more and 220 μm or less. In addition, the thickness of the porous supporting layer is preferably 20 μm or more and 100 μm or less. In the present description, unless otherwise indicated, the thickness means an average value. Here, the average value represents an arithmetic average value. More specifically, the thickness of each of the substrate and the porous supporting layer can be determined through cross-sectional observation by calculating an average value of thicknesses of 20 points measured at 20 μm intervals in a direction (plane direction of the membrane) perpendicular to the thickness direction.

The porous supporting layer for use in the present invention can be selected from various commercial materials such as "Millipore Filter VSWP" (trade name) manufactured by Millipore Corp. and "Ultra Filter UK10" (trade name) manufactured by Toyo Roshi Ltd., but may also be produced according to the method described in "Office of Saline Water Research and Development Progress Report", No. 359 (1968).

(1-3) Separation Functional Layer

The separation functional layer has a thin film containing, as a main component, a crosslinked polyamide obtained by polycondensation reaction of a polyfunctional amine and a polyfunctional acid halide. In other words, the separation functional layer contains a crosslinked polyamide as a main component. Specifically, in the separation functional layer, the ratio of the crosslinked polyamide is 50 wt % or more, 70 wt % or more, or 90 wt % or more, and the separation functional layer may be composed of a crosslinked polyamide. When the separation functional layer contains 50 wt % or more of a crosslinked polyamide, high-efficiency membrane performance is likely to be exhibited. The crosslinked polyamide may be a whole aromatic polyamide (crosslinked aromatic polyamide), may be a whole aliphatic polyamide, or may have both an aromatic moiety and an aliphatic moiety, but in order to exhibit higher performance, a whole aromatic polyamide (crosslinked aromatic polyamide) is preferred.

The polyfunctional amine is, specifically, a polyfunctional aromatic amine or a polyfunctional aliphatic amine.

The "polyfunctional aromatic amine" means an aromatic amine having two or more amino groups per molecule, in which the amino groups are at least either one of a primary amino group and a secondary amino group and at least one of those amino groups is a primary amino group, and the "polyfunctional aliphatic amine" means an aliphatic amine having two or more amino groups per molecule, in which the amino groups are at least either one of a primary amino group and a secondary amino group.

For example, examples of the polyfunctional aromatic amine include a polyfunctional aromatic amine in which two amino groups are bonded to an aromatic ring in a positional relationship of any of ortho-position, meta-position and para-position, such as o-phenylenediamine, m-phenylenediamine, p-phenylenediamine, o-xylylenediamine, m-xylylenediamine, p-xylylenediamine, o-diaminopyridine, m-diaminopyridine and p-diaminopyridine; 1,3,5-triaminobenzene, 1,2,4-triaminobenzene, 3,5-diaminobenzoic acid, 3-aminobenzylamine, 4-aminobenzylamine, 2,4-diaminothioanisole, 1,3-diaminothioanisole, 1,3-diamino-5-(dimethylphosphino)benzene, (3,5-diaminophenyl)dimethylphosphine oxide, (2,4-diaminophenyl)dimethylphosphine oxide, 1,3-diamino-5-(methylsulfonyl)benzene, 1,3-diamino-4-(methylsulfonyl)benzene, 1,3-diamino-5-nitrosobenzene, 1,3-diamino-4-nitrosobenzene, 1,3-diamino-5-(hydroxyamino)benzene, and 1,3-diamino-4-(hydroxyamino)benzene.

Examples of the polyfunctional aliphatic amine include ethylenediamine, 1,3-diaminopropane, 1,4-diaminobutane, 1,5-diaminopentane, piperazine, 2-methylpiperazine, 2,4-dimethylpiperazine, 2,5-dimethylpiperazine, and 2,6-dimethylpiperazine.

One of these polyfunctional amines may be used alone, or two or more thereof may be used in combination.

The polyfunctional acid halide is, specifically, a polyfunctional aromatic acid halide or a polyfunctional aliphatic acid halide.

The polyfunctional acid halide is also expressed as a polyfunctional carboxylic acid derivative and indicates an acid halide having at least two carbonyl halide groups per molecule. For example, examples of the trifunctional acid halide include trimesoyl chloride, and examples of the bifunctional acid halide include biphenyldicarboxylic acid dichloride, azobenzenedicarboxylic acid dichloride, terephthalic acid chloride, isophthalic acid chloride, naphthalenedicarboxylic acid chloride, and oxalyl chloride.

Considering the reactivity with the polyfunctional amine, the polyfunctional acid halide is preferably a polyfunctional acid chloride, and considering selective separability and heat resistance of the membrane, a polyfunctional acid chloride having from 2 to 4 carbonyl chloride groups per molecule is preferred.

Among others, in view of availability and ease of handling, trimesoyl chloride is more preferred. One of these polyfunctional acid halides may be used alone, or two or more thereof may be used in combination.

The polycondensation reaction is specifically interfacial polycondensation.

Here, at least either the polyfunctional amine or the polyfunctional acid halide preferably contains a tri- or higher functional compound.

In order to obtain sufficient separation performance and gas permeability, the thickness of the separation functional layer is usually from 0.01 µm to 1 µm, preferably from 0.1 µm to 0.5 µm. Hereinafter, the separation functional layer for use in the present invention is sometimes referred to as the polyamide separation functional layer.

In the crosslinked polyamide contained in the separation functional layer, the number A of terminal amino groups, the number B of terminal carboxy groups, and the number C of amide groups, which are possessed by the crosslinked polyamide, satisfy $(A+B)/C \leq 0.66$.

An amino group and a carboxy group are known to be a functional group having strong affinity for carbon dioxide. The present inventors have found that when the ratio $((A+B)/C)$ of the number A of terminal amino groups and the number B of terminal carboxy groups to the number C of amide groups in the crosslinked polyamide becomes small (specifically, 0.66 or less), the affinity for carbon dioxide is reduced in the separation functional layer and only the permeability to the carbon dioxide decreases without decreasing the permeability to a light gas such as hydrogen or helium, whereby the light gas/carbon dioxide separation selectivity is enhanced.

In view of the light gas/carbon dioxide separation selectivity, $(A+B)/C$ is preferably 0.65 or less, more preferably 0.64 or less, still more preferably 0.57 or less.

The lower limit of the ratio $((A+B)/C)$ of the number A of terminal amino groups and the number B of terminal carboxy groups to the number C of amide groups in the crosslinked polyamide is not limited to a specific numerical value but may be, for example, 0.48 or more.

Furthermore, in the crosslinked polyamide contained in the separation functional layer, the ratio B/C of the number B of terminal carboxy groups to the number C of amide groups, which are possessed by the crosslinked polyamide, is preferably 0.35 or less.

When B/C is 0.35 or less, the light gas/carbon dioxide selectivity is more enhanced. The reason therefor is considered to be that (1) a carboxy group has, above all, a high carbon dioxide affinity and a decrease in the number thereof enables to effectively reduce the carbon dioxide affinity of the crosslinked polyamide; and (2) a carboxy group forms a hydrogen bond with an amide group in the polyamide separation functional layer but since B/C is 0.35 or less, this hydrogen bond moiety decreases, leading to formation of a passage through which only a light gas can pass.

The lower limit of B/C is not particularly limited, but B/C is preferably, for example, 0.22 or more.

Here, the ratio of the number A of terminal amino groups, the number B of terminal carboxy groups and the number C of amide groups can be determined by $^{13}C$ solid NMR measurement of the separation functional layer. Specifically, the substrate is peeled off from 5 m² of the gas separation membrane to obtain the polyamide separation functional layer and the porous supporting layer, and the porous supporting layer is then dissolved and removed to obtain the polyamide separation functional layer. The obtained polyamide separation functional layer is measured by the DD/MAS-$^{13}C$ solid NMR method, and the ratio of numbers of respective functional groups can be calculated by comparing the integrated value of carbon peaks of each functional group or peaks of carbon bonded with each functional group.

Furthermore, the crosslinked polyamide for use in the present invention preferably has a nitro group. The nitro group may be contained in a monomer at the time of crosslinked polyamide-forming reaction or may be introduced by chemical conversion after forming the crosslinked polyamide, but in view of availability and ease of handling of the monomer, a method of introducing the nitro group by chemical formation after forming the crosslinked polyamide is preferred.

2. Production Method of Gas Separation Membrane

The production method of the above-described gas separation membrane is described below.

(2-1) Formation of Supporting Membrane

A laminate of a substrate and a porous supporting layer is called a supporting membrane. The method for forming the supporting membrane includes: a step of preparing a polymer solution by dissolving a polymer as a constituent component of the porous supporting layer in a good solvent for the polymer; a step of coating a substrate with the polymer solution; and a step of immersing the polymer solution in a coagulation bath to wet-coagulate the polymer.

In the case of using a polysulfone, the polymer solution is obtained by dissolving the polysulfone in N,N-dimethylformamide (hereinafter, referred to as DMF). As the coagulation bath, water is preferably used.

(2-2) Production Method of Separation Functional Layer

Next, the step of forming a separation functional layer constituting the gas separation membrane is described. The step of forming a separation functional layer includes:

(a) a step of bringing an aqueous solution containing a polyfunctional amine into contact with a porous supporting layer; and (b) a step of bringing an organic solvent solution containing a polyfunctional acid halide into contact with the porous supporting layer which has been contacted with the aqueous solution containing a polyfunctional amine.

In the step (a), the concentration of the polyfunctional amine in the aqueous polyfunctional amine solution is preferably from 0.1 to 20 wt %, more preferably from 0.5 to 15 wt %. When the concentration of the polyfunctional amine is within the range above, sufficient solute removal performance and water permeability can be obtained.

In the aqueous polyfunctional amine solution, as long as the reaction of the polyfunctional amine with the polyfunctional acid halide is not inhibited, a surfactant, an organic solvent, an alkaline compound, an antioxidant, etc. may be contained. The surfactant has an effect of enhancing the wettability of the supporting membrane surface and decreasing the interfacial tension between the aqueous polyfunctional amine solution and a non-polar solvent. The organic solvent sometimes acts as a catalyst for interfacial polycondensation reaction and when it is added, the interfacial polycondensation reaction may be efficiently performed.

Contact of the aqueous polyfunctional amine solution with the porous supporting layer is preferably performed uniformly and continuously on the porous supporting layer. Specifically, the method therefor includes, for example, a method of coating the porous supporting layer with the aqueous polyfunctional amine solution, and a method of immersing the porous supporting layer in the aqueous polyfunctional amine solution. The contact time of the porous supporting layer with the aqueous polyfunctional amine solution is preferably 1 second or more and 10 minutes or less, more preferably 10 seconds or more and 3 minutes or less.

After the aqueous polyfunctional amine solution is brought into contact with the porous supporting layer, liquid removal is sufficiently performed to allow for no remaining of liquid droplets on the membrane. Sufficient liquid removal makes it possible to prevent a remaining portion of liquid droplets from working out to a membrane defect after the formation of the porous supporting layer, thereby reducing the membrane performance. As the method for liquid removal, there may be used, for example, the method described in JP-A-2-78428 where the supporting membrane after the contact with the aqueous polyfunctional amine solution is vertically held to allow excess aqueous solution to undergo gravity flow, and a method of spraying a stream such as nitrogen from an air nozzle to forcibly perform liquid removal. In addition, it is also possible to partially remove water of the aqueous solution by drying the membrane surface after liquid removal.

In the step (b), the concentration of the polyfunctional acid halide in the organic solvent solution is preferably from 0.01 to 10 wt %, more preferably from 0.02 to 2.0 wt %. Because, when the concentration thereof is 0.01 wt % or more, a sufficient reaction rate is obtained, whereas when it is 10 wt % or less, occurrence of a side reactions can be suppressed. Furthermore, it is more preferable to incorporate an acylation catalyst such as DMF into this organic solvent solution, because interfacial polycondensation is promoted.

The organic solvent is preferably a solvent that is water-immiscible, dissolves the polyfunctional acid halide and does not damage the supporting membrane, and may be sufficient if it is inert to the polyfunctional amine compound and the polyfunctional acid halide. Preferable examples thereof include a hydrocarbon compound such as n-hexane, n-octane, n-decane and isooctane.

The method for bringing the organic solvent solution containing a polyfunctional acid halide into contact with the porous supporting layer which has been contacted with the aqueous polyfunctional amine solution may be performed in the same manner as the method for bringing the aqueous polyfunctional amine solution into contact with the porous supporting layer.

At this time, the porous supporting layer which has been contacted with the organic solvent solution containing a polyfunctional acid halide may be heated. The heating temperature is 50° C. or more and 180° C. or less, preferably 60° C. or more and 160° C. or less. When the heating is performed at 60° C. or more, reduction of the reactivity along with monomer consumption in the interfacial polymerization reaction can be compensated for by the reaction-accelerating effect due to heat. When the heating is performed at 160° C. or less, the solvent can be prevented from completely volatilizing to cause a significant reduction in the reaction efficiency.

In addition, the heat treatment time is preferably 5 seconds or more and 180 seconds or less. When the heat treatment time is 5 seconds or more, the reaction-accelerating effect can be obtained, whereas when it is 180 seconds or less, the solvent can be prevented from completely volatilizing.

By thus performing the reaction in a good manner, the molecular weight of the crosslinked polyamide is increased, and (A+B)/C is reduced, so that the separation selectivity can be enhanced.

Furthermore, the obtained gas separation membrane is subjected to chemical treatment to cause chemical conversion of the terminal amino group or terminal carboxy group possessed by the crosslinked polyamide, thereby forming a nitro group structure having low affinity for carbon dioxide, so that (A+B)/C can be reduced. Specifically, it is preferable to bring a water-soluble oxidizing agent into contact with the gas separation membrane, and examples of the water-soluble oxidizing agent include hydrogen peroxide, peracetic acid, sodium perborate, and potassium peroxysulfate.

The method for reacting the water-soluble oxidizing agent with the crosslinked polyamide is not particularly limited, but, for example, a method of immersing the gas separation membrane including the crosslinked polyamide in an aqueous solution containing the water-soluble oxidizing agent is preferred.

The concentration of the water-soluble oxidizing agent is preferably from 0.1 to 10 wt %, more preferably from 0.5 to 3 wt %.

The pH of the aqueous solution containing the water-soluble oxidizing agent is not particularly limited as long as it is within a range where the oxidizing power of the oxidizing agent can be fully exerted, but it is preferably from 1.5 to 7.0.

As the method for chemical treatment, the aqueous solution containing the water-soluble oxidizing agent is preferably treated at 10° C. or more and 100° C. or less, more preferably treated at 20° C. or more and 80° C. or less. When the temperature is 20° C. or more, the reaction efficiency can be enhanced, whereas when it is 80° C. or less, decomposition of the oxidizing agent can be suppressed.

The contact time of the aqueous solution containing the water-soluble oxidizing agent with the crosslinked polyamide is preferably from 30 seconds to 1 day and from the viewpoint of satisfying both practicability and reaction efficiency, more preferably from 1 minute to 30 minutes.

After the contact of the aqueous solution containing the water-soluble oxidizing agent with the crosslinked polyamide, in order to stop the oxidation reaction, the crosslinked polyamide is put into contact with a reducing agent. Here, the reducing agent is not particularly limited as long as it causes an oxidation-reduction reaction with the oxidizing agent used, but in view of availability and ease of handling, it is preferable to use any of sodium hydrogensulfite, sodium sulfite, and sodium thiosulfate. Such a compound is preferably used as a 0.01 to 1 wt % aqueous solution.

The contact time of the reducing agent with the crosslinked polyamide may be sufficient if the oxidation reaction can be stopped, and usually, it is preferably from 1 minute to 20 minutes.

After the contact of the reducing agent with the crosslinked polyamide, the crosslinked polyamide composite membrane is preferably rinsed with water so as to remove the reducing agent remaining on or in the membrane.

Incidentally, the presence of a functional group derived from the above-described nitro group can be determined by analyzing the polyamide by X-ray photoelectron spectroscopy (XPS). Specifically, the presence can be determined using X-ray photoelectron spectroscopy (XPS) illustrated in Journal of Polymer Science, Vol. 26, 559-572 (1988) or Adhesion (Journal of the Adhesion Society of Japan), Vol. 27, No. 4 (1991).

The N1s peak obtained by XPS is originated from an inner-shell electron of nitrogen atom. The N1s peak is considered to be composed of an N—C-derived component and an NOx (x≥2)-derived component. Therefore, when N1s peak is separated into the two components, the N—C-derived component and the NOx (x≥2)-derived component appear around 400 eV and around 406 eV, respectively, and therefore, the presence of nitro group can be detected.

The gas separation membrane obtained in this way needs to be dried. The method for drying is not particularly limited, but water may be removed by vacuum drying, freeze drying or high-temperature heating, or after the membrane is immersed in an alcohol solvent such as ethanol and isopropanol or a hydrocarbon solvent to replace water by the solvent, the solvent may be removed under the drying conditions described above.

Among others, high-temperature heating is preferred, because a dense separation functional layer is simply and easily obtained. The method for high-temperature heating is not particularly limited, but the membrane is preferably heated in an oven at 30 to 200° C., preferably at 50 to 150° C., for 1 minute or more. When the temperature is 50° C. or more, water is efficiently removed, whereas when it is 150° C. or less, deformation attributable to difference in thermal shrinkage factor between the separation functional layer and the substrate can be prevented.

3. Gas Separation Membrane Element (3-1) Outline

The gas separation membrane element of the present invention includes a central tube for collecting permeate gas, and the above-described gas separation membrane of the present invention spirally wound around the central tube.

In one embodiment of the gas separation membrane element of the present invention, as illustrated in FIG. 1, the gas separation membrane element 1 includes a gas collection tube 2, a gas separation membrane 3, a feed-side channel material 4, and a permeate-side channel material 6. However, the present invention is not limited to this configuration. The gas separation membrane 3 is wound around the gas collection tube 2 and is disposed such that the width direction of the gas separation membrane 3 runs along the longitudinal direction of the gas collection tube 2. As a result, the gas separation membrane 3 is disposed with its length direction running along the winding direction.

Incidentally, the "inside end in the winding direction" corresponds to the end closer to the gas collection tube 2 in the gas separation membrane 3.

(3-2) Gas Collection Tube

The gas collection tube 2 is an example of the central tube for collecting the permeate gas. The gas collection tube 2 is sufficient if it is configured to allow the permeate gas to flow therethrough, and its material, shape, size, etc. are not particularly limited, but as the material, in view of pressure resistance and heat resistance, a tube made of a metal such as SUS (Stainless Used Steel), aluminum, copper, brass and titanium is suitably used. As the shape, for example, a cylindrical member having a side surface provided with a plurality of holes is used.

(3-3) Gas Separation Membrane

As for the gas separation membrane 3, a plurality of the gas separation membranes 3 are wound around the gas collection tube 2. The gas separation membrane 3 is disposed by arranging its feed-side face to face the feed-side channel material 4 and its permeate-side face to face the permeate-side channel material 6.

Specifically, the gas separation membrane 3 is folded such that the feed-side face faces itself. Another folded gas separation membrane 3 is laid on the thus-folded gas separation membrane 3, and these membranes are thereby disposed such that the permeate-side face of one gas separation membrane 3 faces the permeate-side face of another gas separation membrane 3.

In the stacked gas separation membranes 3, the space between permeate-side faces is sealed at 3 sides excluding the inside end in the winding direction. The thus-formed gas separation membrane with the permeate-side faces being bonded together is referred to as an envelope-like membrane 5 and denoted by reference numeral "5".

The envelope-like membrane 5 is a gas separation membrane pair having a set of two membranes disposed such that the permeate-side faces of the face-to-face gas separation membranes 3 face each other. The envelope-like membrane 5 is rectangular in shape and in order for the permeate gas to flow through the gas collection tube 2, the space between the permeate-side faces in the rectangular shape of the gas separation membrane 3 is left open only at one side on the inner side in the winding direction and sealed at other three sides. The permeate gas is isolated from the feed gas 9 by this envelope-like membrane 5.

Examples of the sealing includes a form of being adhered with an adhesive, a hot melt, etc., a form of being fused by heating, laser, etc., and a form of rubber sheet insertion. The sealing by adhesion is most convenient and highly effective and therefore, is particularly preferred.

In addition, in the example described above, the feed-side face of the gas separation membrane 3 is closed by folding at the inside end in the winding direction, however, this portion may be sealed not by folding but by adhesion, fusion, etc. When the feed-side face of the gas separation membrane 3 is not folded but sealed, deflection at the end of the gas separation membrane 3 is less likely to occur. Since occurrence of deflection near a fold is suppressed, generation of a gap between gas separation membranes 3 at the time of winding and generation of leakage due to the gap are suppressed.

Incidentally, the stacked gas separation membranes 3 may have the same configuration or may have different configurations.

In the permeate-side face or feed-side face of the gas separation membrane 3, the gas separation membranes 3 facing each other may be two different gas separation membranes 3 or may be formed by folding one gas separation membrane 3.

A permeate-side channel material 6 may or may not be disposed inside the envelope-like membrane 5, and a feed-side channel member 4 may or may not be disposed between two adjacent envelope-like membranes 5.

(3-4) Permeate-Side Channel Material

The gas separation membrane element 1 may or may not have but preferably has a permeate-side channel material 6. In the case of having the permeate-side channel material 6, as illustrated in FIG. 1, it is provided inside the envelope-like membrane 5, i.e., between permeate-side faces of the face-to-face gas separation membranes 3.

As the permeate-side channel material 6, a net-shaped material is suitably used. The material of the permeate-side channel material 6 is not particularly limited, but a metal such as SUS, aluminum, copper, brass and titanium, or a polymer such as urethane resin, epoxy resin, polyethersulfone, polyacrylonitrile, polyvinyl chloride, polyvinylidene chloride, polyvinyl alcohol, ethylene-vinyl alcohol copolymer, polystyrene, styrene-acrylonitrile copolymer, styrene-butadiene-acrylonitrile copolymer, polyacetal, polymethyl methacrylate, methacryl-styrene copolymer, cellulose acetate, polycarbonate, polyethylene terephthalate, polybutadiene terephthalate and fluororesin (e.g., polychlorotrifluoroethylene, polyvinylidene fluoride, polytetrafluoroethylene, tetrafluoroethylene-hexafluoropropylene copolymer, tetrafluoroethylene-perfluoroalkoxyethylene copolymer, tetrafluoroethylene-ethylene copolymer), may also be selected. Incidentally, these materials are used individually or as a mixture of two or more thereof.

(3-5) Feed-Side Channel Material

The gas separation membrane element 1 may or may not have but preferably has a feed-side channel material 4. In the case of having the feed-side channel material 4, as illustrated in FIG. 1, it is provided between feed-side faces of the face-to-face gas separation membranes 3.

The feed-side channel material 4 is sufficient if a space enabling a mixed gas to pass through while coming into contact with the gas separation membrane 3 can be ensured between gas separation membranes 3.

The height (thickness) of the feed-side channel material 4 is preferably more than 0.5 mm and 2.0 mm or less, more preferably 0.6 mm or more and 1.0 mm or less, in consideration of the balance among respective performances and the operation cost.

The feed-side channel material 4 is not particularly limited in its shape but includes, for example, a member such as film or net. The material for the feed-side channel material 4 is not particularly limited, but a metal such as SUS, aluminum, copper, brass and titanium, or a polymer such as urethane resin, epoxy resin, polyethersulfone, polyacrylonitrile, polyvinyl chloride, polyvinylidene chloride, polyvinyl alcohol, ethylene-vinyl alcohol copolymer, polystyrene, styrene-acrylonitrile copolymer, styrene-butadiene-acrylonitrile copolymer, polyacetal, polymethyl methacrylate, methacryl-styrene copolymer, cellulose acetate, polycarbonate, polyethylene terephthalate, polybutadiene terephthalate and fluororesin (e.g., polychlorotrifluoroethylene, polyvinylidene fluoride, polytetrafluoroethylene, tetrafluoroethylene-hexafluoropropylene copolymer, tetrafluoroethylene-perfluoroalkoxyethylene copolymer, tetrafluoroethylene-ethylene copolymer), may also be selected. Incidentally, these materials are used individually or as a mixture of two or more thereof. Furthermore, the material for the feed-side channel material 4 may be the same as or different from the material for the gas separation membrane 3.

(3-6) Other Constituent Elements

The gas separation membrane element 1 further includes the following configuration, in addition to the above-described configuration.

That is, the gas separation membrane element 1 includes, at both ends thereof (namely, a first end and a second end), a perforated end plate 7 having a plurality of holes capable of passing the feed gas 9. Furthermore, in the gas separation membrane element 1, an exterior body 8 is wound around an outer periphery of the wound gas separation membrane 3 (hereinafter, referred to as a "wound body").

4. Gas Separation Method

The gas separation membrane of the present invention can be utilized in a gas separation method for removing carbon dioxide. That is, the gas separation method in the present invention includes:

(1) a step of feeding a mixed gas containing carbon dioxide to one face of the gas separation membrane; and (2) a step of, after the step (1), obtaining a gas having a carbon dioxide concentration lower than a carbon dioxide concentration of the mixed gas, from the other face of the gas separation membrane.

The gas contained in the mixed gas other than carbon dioxide is not limited to specific types, but it is preferable to contain, for example, at least either hydrogen or helium. Because, the gas separation membrane of the present invention has a large difference between the permeability for hydrogen and helium and the permeability for carbon dioxide, thereby being able to efficiently remove carbon dioxide.

The gas having permeated through the gas separation membrane, i.e., the gas having a low carbon dioxide concentration, is referred to as "permeate gas", and the gas having not passed through the gas separation membrane but remaining on one face of the gas separation membrane is referred to as "retentate gas".

In the gas separation method of the present invention, the above-described spiral-type gas separation membrane element can be used. Furthermore, in the gas separation method of the present invention, a gas separation membrane module having a pressure vessel and spiral-type gas separation membrane elements connected in series or in parallel and housed in the pressure vessel can also be used.

In the gas separation membrane of the present invention or its element or module, a mixed gas is fed thereto and separated into permeate gas and retentate gas, and a specific gas can thereby be separated from the feed gas. At this time, the feed gas may be fed to the gas separation membrane or its element or module by raising the pressure with a compressor, or the pressure on the permeate side of the gas separation membrane or its element or module may be reduced by use of a pump. Furthermore, gas separation may be performed by disposing the element or module described above over a plurality of stages. In the case of using a plural-stage element or module, either retentate gas or permeate gas in the previous-stage module may be fed to the subsequent-stage module. In addition, retentate gas or permeate gas in the subsequent-stage module may be mixed with feed gas of the previous-stage module. At the time of feeding permeate gas or retentate gas to the subsequent-stage module, a pressure may be applied by compressor.

The gas feed pressure is not particularly limited but is preferably from 0.1 MPa to 10 MPa. When the gas feed pressure is 0.1 MPa or more, the gas permeation rate increases, whereas when it is 10 MPa or less, the gas separation membrane or its element or module member can be prevented from undergoing pressure deformation. The value of "feed-side pressure/permeate-side pressure" is also not particularly limited but is preferably from 2 to 20. When the value of "feed-side pressure/permeate-side pressure" is 2 or more, the gas permeation rate can be increased, whereas when it is 20 or less, the power cost of the compressor on the feed side or the pump on the permeate side can be saved.

The gas feed temperature is not particularly limited but is preferably from 0 to 200° C., more preferably from 25 to 180° C. When the gas feed temperature is 25° C. or more, good gas permeability is obtained, whereas when it is 180° C. or less, the module member can be prevented from thermal deformation.

Gas separation is described by referring to FIG. 1. The feed gas 9 fed from the first end of the gas separation membrane element 1 passes through holes of the perforated end plate 7 and flows into the feed-side flow channel. The feed gas 9 thus put into contact with the feed-side face of the gas separation membrane 3 is separated by the gas separation membrane 3 into permeate gas 11 and retentate gas 10. The permeate gas 11 flows into the gas collection tube 2 through the permeate-side flow channel. The permeate gas 11 having passed through the gas collection tube 2 flows out to the outside of the gas separation membrane element 1 from the second end of the gas separation membrane element 1. The retentate gas 10 passes through the feed-side flow channel and flows out to the outside of the gas separation membrane element 1 through the holes of the end plate 7 provided at the second end. In this way, a mixed gas can be separated into permeate gas 11 and retentate gas 10.

EXAMPLES

The present invention is described in greater detail below by referring to Examples, but the present invention is not limited by these Examples at all.

(Measurements of Gas Permeability and Selectivity)

Figure 2:
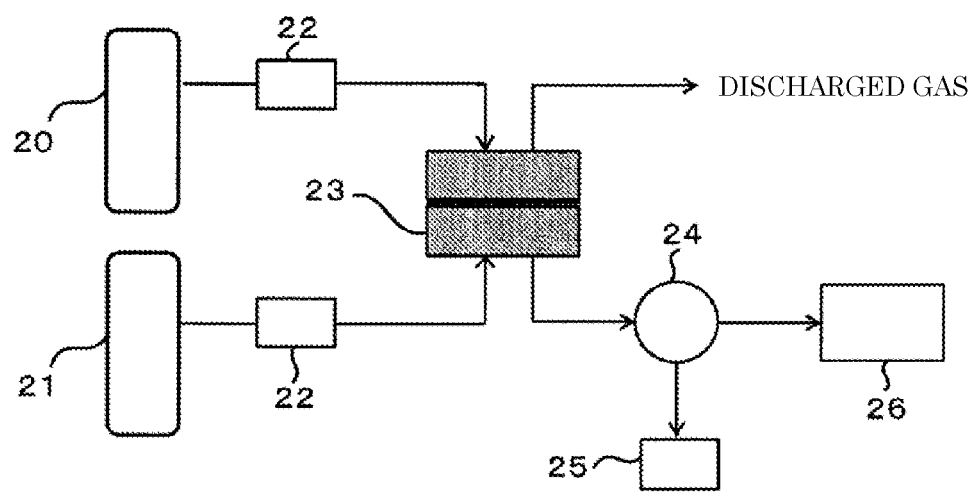
FIG. 2 is a schematic diagram of the apparatus used for measuring gas permeability of the gas separation membrane.

The gas permeability of each of the gas separation membranes obtained in Examples and Comparative Examples was measured in accordance with JIS K 7126-2B by using the apparatus illustrated in FIG. 2.

A permeation cell 23 partitioned by setting a gas separation membrane having an effective membrane area of 25 cm² into two chambers on the feed side and the permeate side was kept at a temperature of 80° C., a pure gas of any of helium, hydrogen and carbon dioxide was flowed at 1 atm to the feed-side cell from a raw material gas cylinder 20 by adjusting the flow rate to 100 cm³/min with a mass flow controller 22, and argon as a sweep gas was flowed at 1 atm to the permeate-side cell from a sweep gas cylinder 21 by adjusting the flow rate to 100 cm³/min with a mass flow controller 22.

By adjusting the valve direction, first, a mixture of permeate gas (i.e., helium, hydrogen or carbon dioxide) and sweep gas was delivered to a gas chromatography 25 having TCD (thermal conductivity detector), and the concentration of the permeate gas in the mixture was analyzed. Subsequently, by adjusting the valve direction, the flow rate of the mixture of permeate gas and sweep gas was measured by a soap film flowmeter 26. The gas permeability was calculated from the thus-measured flow rate and concentration. The results are shown in Table 1.

In addition, the He/CO₂ selectivity and H₂/CO₂ selectivity were calculated by dividing the helium permeability and hydrogen permeability by carbon dioxide permeability. The results are shown in Table 1.

(Quantitative Determination of Carboxy Group, Amino Group, and Amide Group)

The substrate was physically peeled off by hand from 5 m² of each of the gas separation membranes obtained in Examples and Comparative Examples to recover the porous supporting layer and the separation functional layer. The recovered porous supporting layer and separation functional layer were dried by leaving them to stand still at 25° C. for 24 hours and then added little by little to a beaker containing dichloromethane, and the mixture was stirred to dissolve the polymer constituting the porous supporting layer. The insoluble matter in the beaker was recovered with filter paper. This insoluble matter was put in a beaker containing dichloromethane and after stirring, the insoluble matter in the beaker was recovered.

This operation was repeated until the dissolution of the polymer constituting the porous supporting layer in the dichloromethane solution could not detected by UV absorption when the solution was spotted on a plate of thin layer chromatography. The recovered separation functional layer was dried by a vacuum dryer to remove the remaining dichloromethane.

The obtained separation functional layer was freeze-pulverized into a powdery sample, sealed in a sample tube used for solid NMR spectroscopy, and subjected to $^{13}$C solid NMR measurement by CP/MAS method and DD/MAS method. In the $^{13}$C solid NMR measurement, CMX-300 manufactured by Chemagnetics Inc. was used. An example of the measurement conditions is shown below.

Standard substance: polydimethylsiloxane (internal reference: 1.56 ppm)

Sample rotation speed: 10.5 kHz

Pulse repetition time: 100 s

From the obtained spectrum, peak separation was performed for each peak derived from carbon atom bonded with each functional group, and from the areas of separated peaks, (A+B)/C (A is the number of terminal amino groups of the crosslinked polyamide in the separation functional layer, B is the number of terminal carboxy groups, and C is the number of amide groups) and B/C were determined. The results are shown in Table 1.

Comparative Example 1

A 16.0 wt % DMF solution of polysulfone (PSf) was cast on a polyester nonwoven fabric (air permeability, 2.0 cc/cm$^2$/sec) under the condition of 25° C. to a thickness of 200 μm, and the nonwoven fabric was immediately immersed in pure water and allowed to stand for 5 minutes, thereby manufacturing a porous supporting membrane.

In accordance with the method described in International Publication WO 2011/1057278, the porous supporting membrane obtained by the operation described above was immersed in an aqueous solution containing 6 wt % m-phenylenediamine for 2 minutes. Thereafter, the porous supporting membrane was slowly drawn up in a vertical direction, and nitrogen was blown thereonto from an air nozzle to remove excess aqueous solution from the porous supporting membrane surface.

Furthermore, the porous supporting membrane was coated with an undecane solution containing 0.16 wt % of trimesoyl chloride (TMC) at 25° C. to completely wet the surface thereof, left standing still for 1 minute, subjected to liquid removal by vertically holding the porous supporting membrane surface for 1 minute so as to remove excess solution from the porous supporting membrane, left standing still in an oven at 25° C. for 120 seconds, washed with warm water at 50° C. for 10 hours, and dried in an oven at 120° C. for 30 minutes to obtain a gas separation membrane.

Comparative Example 2

A gas separation membrane was obtained by performing the same operation as in Comparative Example 1 except that the solvent for TMC was changed to decane.

Comparative Example 3

The porous supporting membrane obtained in Comparative Example 1 was immersed in an aqueous solution containing m-phenylenediamine and sodium laurylsulfate at a concentration of 2 wt % and 0.15 wt %, respectively, for 2 minutes. Thereafter, the porous supporting membrane was slowly drawn up in a vertical direction, and nitrogen was blown thereonto from an air nozzle to remove excess aqueous solution from the porous supporting membrane surface.

Furthermore, the porous supporting membrane was coated with a hexane solution containing 0.10 wt % of trimesoyl chloride (TMC) at 25° C. to completely wet the surface thereof, left standing still for 1 minute, subjected to liquid removal by vertically holding the membrane surface for 1 minute so as to remove excess solution from the porous supporting membrane, left standing still in an oven at 25° C. for 60 seconds, washed with warm water at 50° C. for 10 hours, and dried in an oven at 120° C. for 30 minutes to obtain a gas separation membrane.

Comparative Example 4

The porous supporting membrane obtained in Comparative Example 1 was immersed in an aqueous solution containing 3.0 wt % of m-phenylenediamine, 0.15 wt % of sodium laurylsulfate, 3.0 wt % of triethylamine, and 6.0 wt % of camphorsulfonic acid for 2 minutes. Thereafter, the porous supporting membrane was slowly drawn up in a vertical direction, and nitrogen was blown thereonto from an air nozzle to remove excess aqueous solution from the porous supporting membrane surface.

Subsequently, the porous supporting membrane was coated with a hexane solution containing 0.20 wt % of trimesoyl chloride at 25° C. to completely wet the surface thereof, left standing still for 1 minute, subjected to liquid removal by vertically holding the membrane surface for 1 minute so as to remove excess solution from the porous supporting membrane, left standing still in an oven at 120° C. for 3 minutes, washed with warm water at 50° C. for 10 hours, and dried in an oven at 120° C. for 30 minutes to obtain a gas separation membrane.

Example 1

The porous supporting membrane obtained in Comparative Example 1 was immersed in an aqueous 6 wt % m-phenylenediamine solution for 2 minutes. Thereafter, the porous supporting membrane was slowly drawn up in a vertical direction, and nitrogen was blown thereonto from an air nozzle to remove excess aqueous solution from the porous supporting membrane surface.

Furthermore, the porous supporting membrane was coated with an undecane solution containing 0.16 wt % of trimesoyl chloride (TMC) at 25° C. to completely wet the surface thereof, left standing still for 30 seconds, left standing still in an oven at 100° C. for 60 seconds, washed with warm water at 50° C. for 10 hours, and dried in an oven at 120° C. for 30 minutes to obtain a gas separation membrane.

Example 2

A gas separation membrane was obtained by performing the same operation as in Example 1 except that the solvent for TMC was changed to decane.

Example 3

The porous supporting membrane obtained in Comparative Example 1 was immersed in an aqueous 6 wt % m-phenylenediamine solution for 2 minutes. Thereafter, the porous supporting membrane was slowly drawn up in a vertical direction, and nitrogen was blown thereonto from an air nozzle to remove excess aqueous solution from the porous supporting membrane surface.

Furthermore, the porous supporting membrane was coated with a decane solution containing 0.16 wt % of trimesoyl chloride (TMC) at 25° C. to completely wet the surface thereof, left standing still for 30 seconds, left standing still in an oven at 100° C. for 120 seconds, washed with warm water at 50° C. for 10 hours, and dried in an oven at 120° C. for 30 minutes to obtain a gas separation membrane.

Example 4

A gas separation membrane was obtained by performing the same operation as in Example 1 except that before the step of drying in an oven at 120° C. for 30 minutes, the membrane was immersed in an aqueous solution having a pH of 2.2 and containing 1 wt % of potassium peroxomonosulfate at 25° C. for 30 minutes.

Example 5

A gas separation membrane was obtained by performing the same operation as in Example 3 except that before the step of drying in an oven at 120° C. for 30 minutes, the membrane was immersed in an aqueous solution having a pH of 2.2 and containing 1 wt % of potassium peroxomonosulfate at 60° C. for 2 minutes.

The interfacial polymerization conditions and post-treatment conditions of Examples and Comparative Examples are shown together in Table 2.

TABLE 1

|  | Permeability (nmol/m²/s/Pa) | | Selectivity | | Ratio of Numbers of Functional Groups | | |
| --- | --- | --- | --- | --- | --- | --- | --- |
|  | He | $H_2$ | $He/CO_2$ | $H_2/CO_2$ | $(A + B)/C$ | $B/C$ | Nitro Group |
| Comparative Example 1 | 120 | 79 | 12 | 8.2 | 1.0 | 0.51 | not contained |
| Comparative Example 2 | 120 | 80 | 13 | 8.4 | 1.0 | 0.48 | not contained |
| Comparative Example 3 | 200 | 100 | 9.6 | 4.8 | 1.1 | 0.57 | not contained |
| Comparative Example 4 | 100 | 74 | 12 | 9.1 | 0.71 | 0.40 | not contained |
| Example 1 | 110 | 72 | 18 | 12 | 0.65 | 0.38 | not contained |
| Example 2 | 120 | 79 | 26 | 18 | 0.64 | 0.35 | not contained |
| Example 3 | 110 | 73 | 32 | 21 | 0.57 | 0.22 | not contained |
| Example 4 | 97 | 71 | 27 | 20 | 0.57 | 0.35 | contained |
| Example 5 | 98 | 64 | 34 | 23 | 0.48 | 0.22 | contained |

TABLE 2

|  | Interfacial Polymerization Conditions | | | Post-Treatment Conditions | | |
| --- | --- | --- | --- | --- | --- | --- |
|  | Organic Solvent | Oven Temperature (° C.) | Heating Time (sec) | Concentration of Potassium Peroxomonosulfate (wt %) | Temperature (° C.) | Time (min) |
| Comparative Example 1 | undecane | 25 | 120 | — | — | — |
| Comparative Example 2 | decane | 25 | 120 | — | — | — |
| Comparative Example 3 | hexane | 25 | 60 | — | — | — |
| Comparative Example 4 | hexane | 120 | 180 | — | — | — |
| Example 1 | undecane | 100 | 60 | — | — | — |
| Example 2 | decane | 100 | 60 | — | — | — |
| Example 3 | decane | 100 | 120 | — | — | — |
| Example 4 | undecane | 100 | 60 | 1 | 25 | 30 |
| Example 5 | decane | 100 | 120 | 1 | 60 | 2 |

As apparent from the results in Table 1, the gas separation membranes of Examples 1 to 5 satisfying $(A+B)/C \leq 0.66$ have an $He/CO_2$ selectivity of 18 or more and $H_2/CO_2$ selectivity of 12 or more and are confirmed to have high performance as a gas separation membrane.

Furthermore, comparing between Examples 1 and 2, $(A+B)/C$ is substantially the same, but since B/C is 0.35 or less, the $H_2/CO_2$ selectivity is increased from 12 to 18, revealing that the gas separation membrane has higher gas separation performance.

In addition, comparing between Examples 2 and 4 and between Examples 3 and 5, when the crosslinked polyamide has a nitro group, the $He/CO_2$ selectivity and $H_2/CO_2$ selectivity are enhanced.

When a gas separation module is manufactured using the gas separation membrane described in these Examples, high light gas/$CO_2$ selectivity can be exhibited.

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2016-211464) filed on Oct. 28, 2016, the contents of which are incorporated herein by way of reference.

INDUSTRIAL APPLICABILITY

The gas separation membrane element of the present invention is suitably used for separating and purifying a specific gas from a mixed gas.

DESCRIPTION OF REFERENCE NUMERALS AND SIGNS

1: Gas separation membrane element
2: Gas collecting tube
3: Gas separation membrane
4: Feed-side channel material
5: Envelope-like membrane
6: Permeate-side channel material
7: Perforated end plate
8: Exterior body
9: Feed gas
10: Retentate gas
11: Permeate gas
20: Raw material gas cylinder
21: Sweep gas cylinder
22: Mass flow controller
23: Permeation cell equipped with gas separation membrane
24: Valve
25: Gas chromatography
26: Soap film flowmeter

The invention claimed is:

1. A gas separation membrane comprising:
a supporting membrane; and
a separation functional layer which is provided on the supporting membrane and comprises a crosslinked polyamide obtained by polycondensation of a polyfunctional amine having two or more amino groups per molecule, and a polyfunctional acid halide having two or more carbonyl halide groups per molecule,
wherein,
the crosslinked polyamide has a nitro group, and
in the crosslinked polyamide, the number A of terminal amino groups, the number B of terminal carboxy groups, and the number C of amide groups satisfy: $(A+B)/C \leq 0.66$.

2. The gas separation membrane according to claim 1, wherein, in the crosslinked polyamide, the number A of terminal amino groups, the number B of terminal carboxy groups, and the number C of amide groups satisfy $0.48 \leq (A+B)/C$.

3. The gas separation membrane according to claim 1, wherein, in the crosslinked polyamide, the number B of terminal carboxy groups and the number C of amide groups satisfy $B/C \leq 0.35$.

4. The gas separation membrane according to claim 1, wherein, in the crosslinked polyamide, the number B of terminal carboxy groups and the number C of amide groups satisfy $0.22 \leq B/C$.

5. The gas separation membrane according to claim 1, wherein the crosslinked polyamide is a crosslinked aromatic polyamide.

6. A gas separation membrane element comprising:
a central tube for collecting permeate gas; and
the gas separation membrane according to claim 1 spirally wound around the central tube.

7. A gas separation method using the gas separation membrane according to claim 1, the method comprising the following steps:
(1) a step of feeding a mixed gas containing carbon dioxide to one face of the gas separation membrane; and
(2) a step of, after the step (1), obtaining a gas having a carbon dioxide concentration lower than a carbon dioxide concentration of the mixed gas, from the other face of the gas separation membrane.

8. The gas separation method according to claim 7, wherein the mixed gas contains at least either hydrogen or helium.

* * * * *